(12) United States Patent
Blyweert

(10) Patent No.: US 11,599,283 B2
(45) Date of Patent: Mar. 7, 2023

(54) POWER REDUCTION IN DISTRIBUTED STORAGE SYSTEMS

(71) Applicant: Western Digital Technologies, Inc., San Jose, CA (US)

(72) Inventor: Stijn Blyweert, Colorado Springs, CO (US)

(73) Assignee: Western Digital Technologies, Inc., San Jose, CA (US)

(\*) Notice: Subject to any disclaimer, the term of this patent is extended or adjusted under 35 U.S.C. 154(b) by 334 days.

(21) Appl. No.: 16/667,670

(22) Filed: Oct. 29, 2019

(65) Prior Publication Data

US 2021/0124513 A1 Apr. 29, 2021

(51) Int. Cl.
*G06F 1/32* (2019.01)
*G06F 3/06* (2006.01)

(52) U.S. Cl.
CPC ............ *G06F 3/0634* (2013.01); *G06F 3/067* (2013.01); *G06F 3/0625* (2013.01)

(58) Field of Classification Search
None
See application file for complete search history.

(56) References Cited

U.S. PATENT DOCUMENTS

| | | | |
|---|---|---|---|
| 7,146,524 B2 | 12/2006 | Patel et al. | |
| 7,685,126 B2 | 3/2010 | Patel et al. | |
| 7,747,736 B2 | 6/2010 | Childress et al. | |
| 8,112,395 B2 | 2/2012 | Patel et al. | |
| 8,156,368 B2 | 4/2012 | Chambliss et al. | |
| 8,370,672 B2 | 2/2013 | Thereska et al. | |
| 8,572,330 B2 | 10/2013 | Kottomtharayil et al. | |
| 9,690,660 B1 | 6/2017 | Robins et al. | |
| 9,716,617 B1 | 7/2017 | Ahuja et al. | |
| 10,078,552 B2 | 9/2018 | De Keyser et al. | |
| 2011/0213994 A1 | 9/2011 | Thereska et al. | |
| 2012/0166726 A1\* | 6/2012 | De Schrijver | G06F 11/2094 711/114 |
| 2013/0060999 A1 | 3/2013 | Chiu | |
| 2013/0286579 A1\* | 10/2013 | De Spiegeleer | G06F 3/0665 361/679.33 |

(Continued)

OTHER PUBLICATIONS

Mastering Ceph: Redefine your storage system, Nick Frisk, Published May 2017 by Packt Publishing Ltd.

(Continued)

*Primary Examiner* — Fahmida Rahman
(74) *Attorney, Agent, or Firm* — Patent Law Works LLP

(57) ABSTRACT

Techniques are described for reducing power consumption in a distributed data storage system using a hierarchy rule that is generated based on a spreading policy and a set of tolerable failures. A method may operate to distribute erasure-encoded data of a first data object across first and second portions of a distributed storage system using a hierarchy rule corresponding to a spreading policy based on a set of tolerable failures from which the first data object can be recovered. The method disables the first portion of the distributed storage system that includes a first portion of the erasure-encoded data. The first portion of the distributed storage system is determined according to the spreading policy and the hierarchy rule identifies the set of tolerable failures.

18 Claims, 5 Drawing Sheets

(56) References Cited

U.S. PATENT DOCUMENTS

2016/0070617 A1     3/2016   Algie et al.
2016/0246676 A1     8/2016   Bakre et al.

OTHER PUBLICATIONS

Erasure coding for cold storage, Packt Hub, Nick Frisk, Published Jun. 7, 2017, available at https://hub.packtpub.com/erasure-coding-cold-storage/.
B2 Resiliency, Durability and Availability, Christopher, Published Jul. 17, 2018, available at https://help.backblaze.com/hc/en-us/articles/218485257-B2-Resiliency-Durability-and-Availability.
A Distributed Spin-Down Algorithm for an Object-Based Storage Device withWrite Redirection, Timothy Bisson, Published Jan. 2006, available at https://users.soe.ucsc.edu/~sbrandt/papers/WDAS06b.pdf.
International Search Report and Written Opinion, PCT/US2020/024792, dated Jun. 23, 2020 (9 pages).
International Search Report and Written Opinion, PCT/US2017/049507, dated Nov. 8, 2017 (14 pages).

\* cited by examiner

POWER REDUCTION IN DISTRIBUTED STORAGE SYSTEMS

TECHNICAL FIELD

The present disclosure relates to a distributed data storage system. In particular, the present disclosure relates to distributing data in the distributed data storage system for redundancy.

BACKGROUND

There are various approaches in which storage systems store data in a reliable way, for example, using redundancy. Some data distribution algorithms used in the storage systems allow a user to define a protection level by describing failure scenarios that can be tolerated, such that data can still be recovered even after such a failure occurs.

Data recovery in a distributed storage system often requires the creation of additional data which results in the need to provide and power additional storage resources in order to reconstruct data when malfunctions or failures occur. The additional storage resources also consume additional power, which creates additional costs, heat, and leads to earlier failures. While efforts could be applied to improve hardware solutions, such solutions typically evolve over product iterations any may only result in incremental improvements. Alternative improvements may utilize characteristics of the data coding and placement in the storage system.

SUMMARY

The present disclosure relates, in some embodiments, to reducing power consumption in a distributed data storage system using a hierarchy rule that is generated based on a spreading policy and a set of tolerable failures specified by a user.

According to one aspect, the subject matter described in this disclosure may be embodied in computer-implemented methods that include distributing erasure-encoded data of a first data object across first and second portions of a distributed storage system using a hierarchy rule corresponding to a spreading policy based on a set of tolerable failures from which the first data object can be recovered; and disabling the first portion of the distributed storage system that includes a first portion of the erasure-encoded data of the first data object. The first portion of the distributed storage system is determined according to the spreading policy and the hierarchy rule identifying the set of tolerable failures, and the second portion of the distributed storage system includes portions of the erasure-encoded data configured to recreate the first data object.

In some implementations, the methods may include disabling a first portion of the distributed storage system by suspending power to the first portion of the distributed storage system. Also, the distributed storage system may include a hierarchy of one or more of data centers, racks, nodes, and devices, and wherein the first portion that is disabled may be at least one of the nodes. Further, the distributed storage system may include at least a first node and a second node, and disabling the first portion alternates between the first node and the second node. The hierarchy may further include one or more sub-nodes located between the nodes and the devices in the hierarchy. The first portion includes at least one of the sub-nodes. The distributed storage system may include at least a first sub-node and a second sub-node, and the disabling the first portion alternates between the first sub-node and the second sub-node. The spreading policy and the hierarchy rule are selected to allow the first portion of the distributed storage system to be disabled without affecting the distributed storage system from reading or writing the first data.

According to another aspect, a distributed storage system includes a set of non-volatile data storage devices; and a controller node having a memory and one or more processors configured to execute instructions stored in the memory. The controller node is configured to perform operations comprising: distributing erasure-encoded data of a first data object across first and second portions of a distributed storage system using a hierarchy rule corresponding to a spreading policy based on a set of tolerable failures from which the first data object can be recovered; and disabling the first portion of the distributed storage system that includes a first portion of the erasure-encoded data of the first data object. The first portion of the distributed storage system is determined according to the spreading policy and the hierarchy rule identifies the set of tolerable failures. The second portion of the distributed storage system includes portions of the erasure-encoded data configured to recreate the first data object.

In some implementations, the distributed storage system may include disabling a first portion of the distributed storage system by suspending power to the first portion of the distributed storage system. Also, the distributed storage system may include a hierarchy of one or more of data centers, racks, nodes, and devices, and wherein the first portion that is disabled may be at least one of the nodes. The distributed storage system may include at least a first node and a second node, and disabling the first portion alternates between the first node and the second node. The hierarchy may further include one or more sub-nodes located between the nodes and the devices in the hierarchy. The first portion includes at least one of the sub-nodes. The distributed storage system may include at least a first sub-node and a second sub-node, and disabling the first portion alternates between the first sub-node and the second sub-node. The spreading policy and the hierarchy rule are selected to allow the first portion of the distributed storage system to be disabled without affecting the distributed storage system from reading or writing the first data.

According to yet another aspect, a distributed storage system includes a means for distributing erasure-encoded data of a first data object across first and second portions of a distributed storage system using a hierarchy rule corresponding to a spreading policy based on a set of tolerable failures from which the first data object can be recovered; and a means for disabling the first portion of the distributed storage system that includes a first portion of the erasure-encoded data of the first data object. The first portion of the distributed storage system is determined according to the spreading policy and the hierarchy rule identifying the set of tolerable failures, and the second portion of the distributed storage system includes portions of the erasure-encoded data configured to recreate the first data object.

In some implementations, the disabling a first portion of the distributed storage system includes suspending power to the first portion of the distributed storage system. The spreading policy and the hierarchy rule are selected to allow the first portion of the distributed storage system to be disabled without affecting the distributed storage system from reading or writing the first data.

Other implementations of one or more of these aspects include corresponding systems, apparatus, and computer programs, configured to perform the actions of the methods, encoded on computer storage devices. It should be understood that the language used in the present disclosure has been principally selected for readability and instructional purposes, and not to limit the scope of the subject matter disclosed herein.

BRIEF DESCRIPTION OF THE DRAWINGS

The techniques of the present disclosure are illustrated by way of example, and not by way of limitation in the figures of the accompanying drawings in which like reference numerals are used to refer to similar elements.

DETAILED DESCRIPTION

Figure 1:
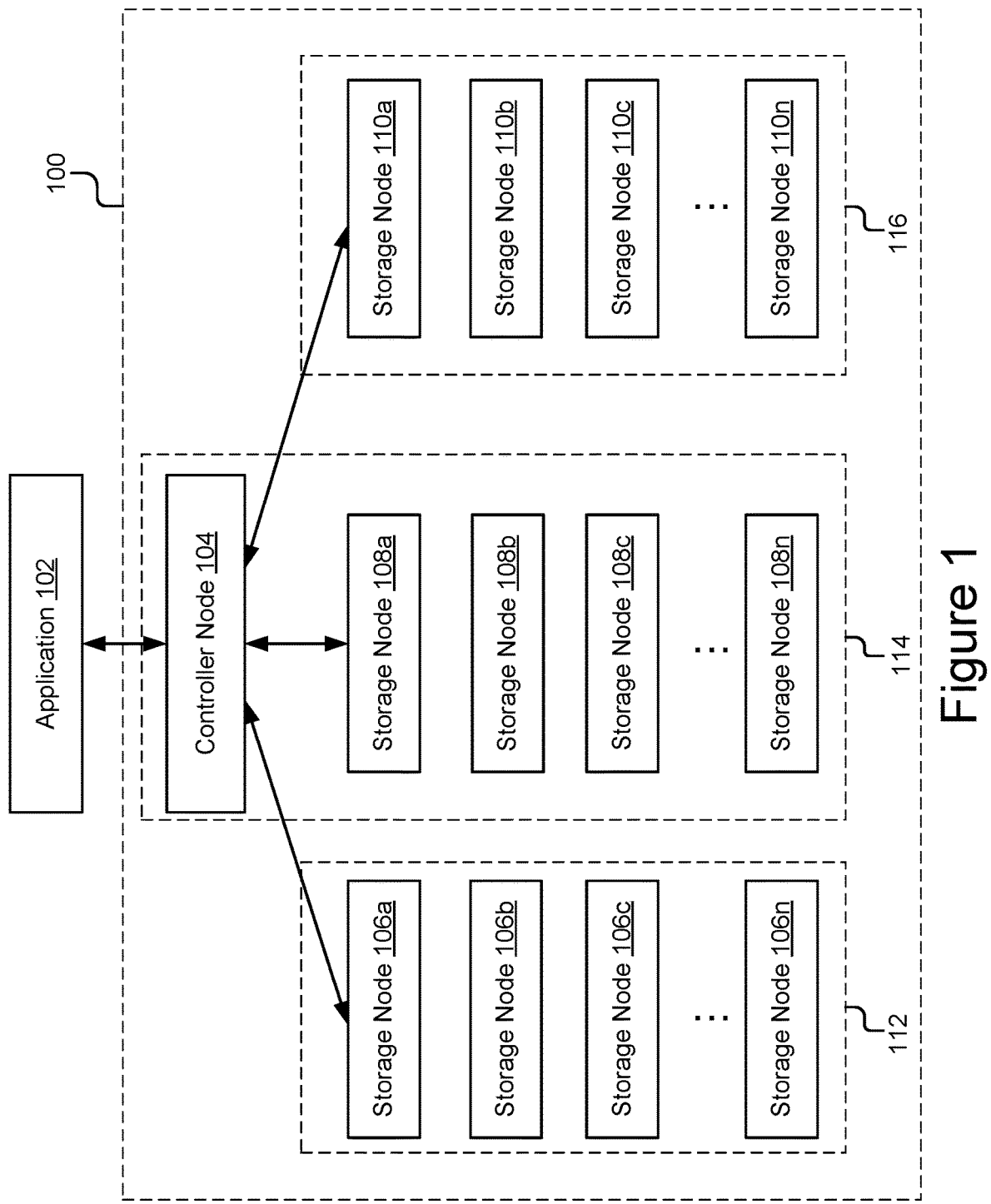
FIG. 1 is a high-level block diagram illustrating an example distributed storage system.

Various aspects, such as systems, methods, computer program products, apparatuses, computer-readable mediums, for reducing power consumption in a distributed data storage system using a hierarchy rule that is generated based on a spreading policy and a set of tolerable failures are described below.

While various aspects of the present disclosure are described in the context of a particular system architecture, it should be understood that the systems and methods can be applied to other architectures and organizations of hardware.

Fault-tolerant systems usually require a form of redundancy or encoding that results in the duplication or increase in the hardware elements necessary to store the increased data. Such increased storage results in an overall increase in the power consumed by the resulting distributed storage system. However, with the increased data, the system can tolerate a certain level of hardware failures. The present embodiments contemplate reducing the power consumed in the system by selectively disabling or powering-down one or more selected portions of the distributed storage system that will not affect the reading or writing of the data based on the hierarchy rule that is generated based on a spreading policy and a set of tolerable failures.

A distributed storage system may include a methodology where spreading width (W), which is the number of erasure-encoded chunks of a single object/file that is written to the storage system. Each chunk is generally written to a different data storage device and is erasure-encoded into a plurality of portions of data (e.g., "chunks"). An algorithm determines the spreading of the different erasure-encoded data chunks into different hardware elements distributed between different data centers, different racks, different storage servers, and different storage devices (e.g., hard disk drives (HDDs) or solid-state drives (SSDs)).

The spreading algorithm takes a spreading policy into account, which includes two main items. First, a spreading width (W), which is the number of erasure-encoded chunks of a single object/file that is written to the storage system. Each chunk is generally written to a different data storage device. Second, a maximum concurrent fault tolerance (F), which is the maximum number of data storage devices that are allowed to fail concurrently. The spreading policy is sometimes written as W/F. The erasure-encoding overhead of the spreading policy is also a very important aspect to take into account. In a type of erasure coding known as a maximum distance separable (MDS) code, for a spreading policy W/F, the overhead can be calculated as W/(W−F). For example, using an 18/5 spreading policy, the erasure-encoding overhead is 18/13~1.38. This means that for every byte of incoming data that needs to be stored in the storage system, about 1.38 bytes are stored on the HDDs of the storage system. Other variations are also possible and contemplated. For other erasure coding algorithms, the overhead will be larger, and the calculation will be different.

FIG. 1 is a high-level block diagram illustrating an example distributed storage system 100 that is accessed by an application 102. In some embodiments, the application 102 is a software application running on a computing device that interacts with the system 100. The computer device may be, for example, a laptop computer, a desktop computer, a tablet computer, a mobile telephone, a personal digital assistant, a mobile email device, a portable game player, a portable music player, a television with one or more processors embedded therein or coupled thereto or any other electronic device capable of making requests to the system 100 and receiving responses from the system 100. In other embodiments, the application 102 comprises a file system that enables a general-purpose software application to interface with the system 100 or an Application Programming Interface library.

The application 102 provides the data for storage in the system 100. The application 102 also requests the data stored in the system 100. For example, the application 102 may be a file transfer application that requests to store a first set of data in the system 100 and to read or write a second set of data from the system 100. In some embodiments, the data is in the form of a data object. The data object comprises the data (e.g., 128-megabyte binary data) and a data object identifier. The data object identifier is a universally unique identifier used for identifying and addressing the data object. Storing data in the form of a data object, also referred to as object storage, is more advantageous than conventional file or block-based storage on scalability and flexibility, which are of particular importance to large scale redundant storage in a distributed storage system as shown in FIG. 1.

The distributed storage system 100 as depicted in FIG. 1 includes a controller node 104, and storage nodes 106a-106n, 108a-108n, and 110a-110n. The controller node 104 may be a computing device configured to make some or all of the storage space for storage of the data provided by the application 102. For example, the controller node 104 generates rules for distributing data of a data object based on user input and determines where to store the data of the data object based on the rules. In some embodiments, the controller node 104 is physically located at a data center, where the controller node 104 along with a plurality of storage nodes 106a-106n, 108a-108n, and 110a-110n are arranged in modular racks as described below.

The storage nodes 106a-106n, 108a-108n, and 110a-110n are computer devices configured to store the data. For example, the storage nodes 106a-106n, 108a-108n, and 110a-110n comprise a plurality of storage elements (e.g., data storage devices or block stores) for storing the data. In some embodiments, the storage nodes 106a-106n, 108a-108n, and 110a-110n are divided into groups based on, for example, whether the storage nodes are housed in a single rack. In the example of FIG. 1, the storage nodes 106a-106n are grouped into rack 112, the storage nodes 108a-108n are grouped into rack 114, and the storage nodes 110a-110n are grouped into rack 116.

In FIG. 1, the controller node 104 is also located in rack 114 as indicated by the dash-lined box of rack 114. The racks can be geographically dispersed across different data centers, for example, racks 112 and 114 can be located at a data center in Europe, while rack 116 can be located at a data center in the United States. Although a single controller node 104 and storage nodes of three racks are shown in FIG. 1, it should be understood that there may be any number of controller nodes 104, storage nodes, or racks. Also, the storage nodes 106a-106n may be collectively referred to as storage nodes 106. Similarly, the storage nodes 108a-108n and 110a-110n may be respectively referred to as storage nodes 108 and 110.

The application 102, the controller node 104, and the storage nodes 106, 108, 110 are interconnected in a data communication network for distributing data of a data object. The data communication network can be a conventional type, wired or wireless, and may have numerous different configurations including a star configuration, token ring configuration, or other configurations. Furthermore, the data communication network may include a local area network (LAN), a wide area network (WAN) (e.g., the internet), and/or other interconnected data paths across which multiple devices (e.g., a computing device comprising the application 102, the controller node 104, the storage nodes, etc.) may communicate.

In some embodiments, the data communication network may be a peer-to-peer network. The data communication network may also be coupled with or include portions of a telecommunications network for sending data using a variety of different communication protocols. In some embodiments, the data communication network may include Bluetooth (or Bluetooth low energy) communication networks or a cellular communications network for sending and receiving data, including direct socket communication (e.g., Transmission Control Protocol/Internet Protocol (TCP/IP) sockets) among software modules, remote procedure calls, User Datagram Protocol (UDP) broadcasts and receipts, Hypertext Transfer Protocol (HTTP) connections, function or procedure calls, a direct data connection, etc. Further, any or all of the communication could be secure (Secure Shell (SSH), HTTP Secure (HTTPS), etc.).

Figure 2:
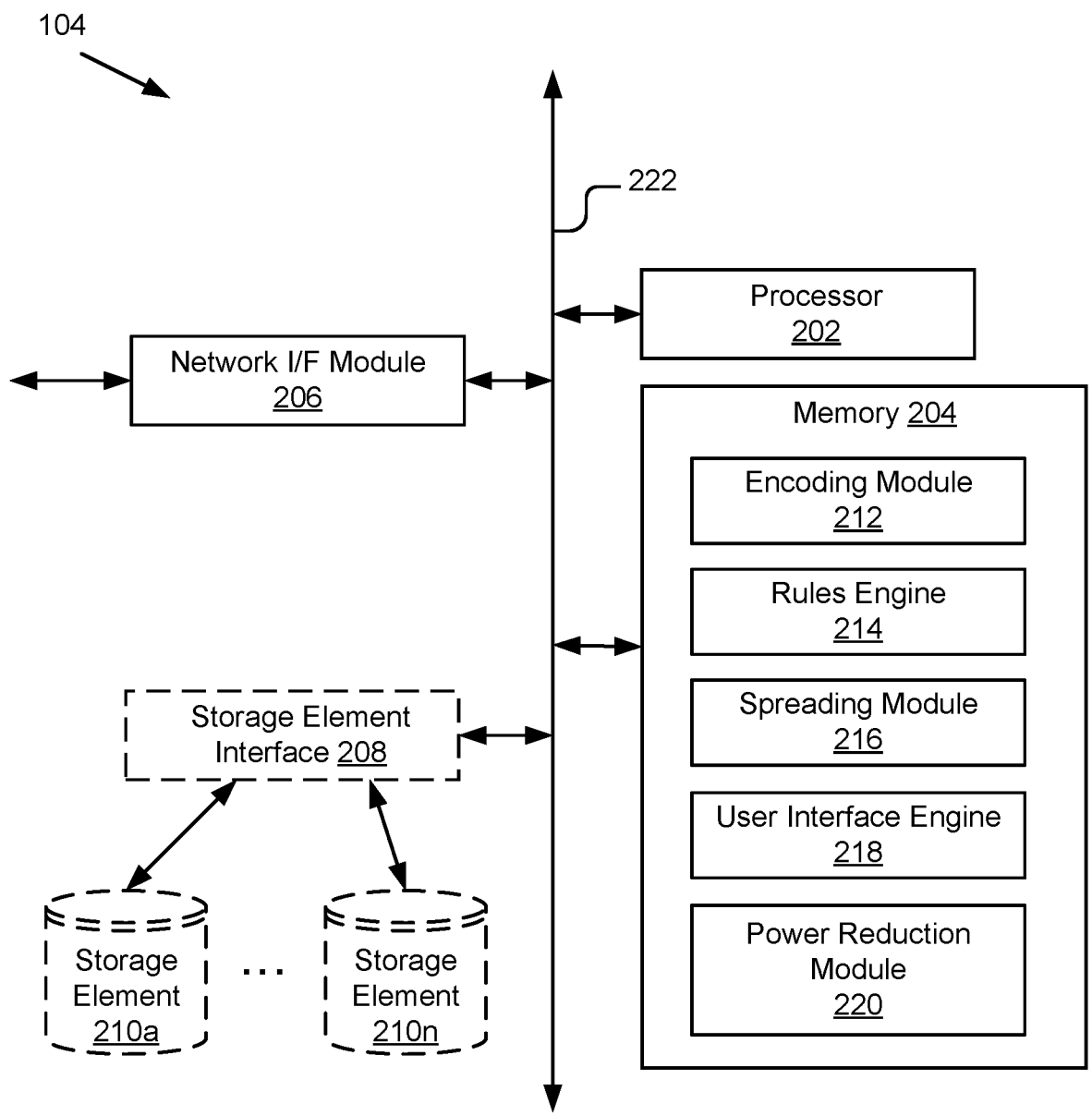
FIG. 2 is a block diagram illustrating an example controller node of the distributed storage system configured to implement the techniques introduced herein.

FIG. 2 is a block diagram illustrating an example controller node 104 of the distributed storage system 100 in FIG. 1. In the example of FIG. 2, the controller node 104 includes a processor 202, a memory 204, a network interface (I/F) module 206, and an optional storage element interface 208. The components of the controller node 104 are communicatively coupled to a bus or software communication mechanism 222 for communication with each other.

The processor 202 may include an arithmetic logic unit, a microprocessor, a general-purpose controller, or some other processor array to perform computations and provide electronic display signals to a display device. In some embodiments, the processor 202 is a hardware processor having one or more processing cores. The processor 202 is coupled to the bus 222 for communication with the other components. Processor 202 processes data signals and may include various computing architectures including a complex instruction set computer (CISC) architecture, a reduced instruction set computer (RISC) architecture, or an architecture implementing a combination of instruction sets. Although only a single processor is shown in the example of FIG. 2, multiple processors and/or processing cores may be included. It should be understood that other processor configurations are possible.

The memory 204 stores instructions and/or data that may be executed by the processor 202. In the illustrated embodiment, the memory 204 includes an encoding module 212, a rules engine 214, a spreading module 216, a user interface engine 218, and a power reduction module 220. The memory 204 is coupled to the bus 222 for communication with the other components of the controller node 104. The instructions and/or data stored in the memory 204 may include code for performing the techniques described herein. The memory 204 may be, for example, non-transitory memory such as a dynamic random-access memory (DRAM) device, a static random-access memory (SRAM) device, flash memory, or some other memory device. In some embodiments, the memory 204 also includes a non-volatile memory or similar permanent storage device and media, for example, a hard disk drive, a floppy disk drive, a compact disc read-only memory (CD-ROM) device, a digital versatile disc read-only memory (DVD-ROM) device, a digital versatile disc random-access memories (DVD-RAM) device, a digital versatile disc rewritable (DVD-RW) device, a flash memory device, or some other non-volatile storage device.

The network interface module 206 is configured to connect the controller node 104 to a data communication network. For example, the network interface module 208 may enable communication through one or more of the Internet, cable networks, and wired networks. The network interface module 206 links the processor 202 to the data communication network that may, in turn, be coupled to other processing systems. The network interface module 206 also provides other conventional connections to the data communication network for distribution and/or retrieval of data objects (e.g., files and/or media objects) using standard network protocols such as Transmission Control Protocol/Internet Protocol (TCP/IP), Hypertext Transfer Protocol (HTTP), Secure Hypertext Transfer Protocol (HTTPS), and Simple Mail Transfer Protocol (SMTP) as will be understood. In some embodiments, the network interface module 206 includes a transceiver for sending and receiving signals using Bluetooth®, or cellular communications for wireless communication.

In some embodiments, the controller node 104 may include or be included in one of the storage nodes 106, 108, or 110 that performs both the function of a controller node and a storage node. In such a case, the controller node 104 includes a storage element interface 208 and one or more storage elements 210a-210n connected via the storage element interface 208 to perform the functions of a storage node. For example, the storage element interface 208 may comprise a Serial Advanced Technology Attachment (SATA) interface or a Small Computer System Interface (SCSI) for connecting the storage elements 210a-210n (e.g., ten 2 terabyte (TB) SATA-II disk drives) to other components of the controller node 104. The storage element interface 208 is configured to control the reading and writing of data to/from the storage elements 210a-210n. For example, the controller node 104 can use the storage element interface 208 to retrieve the data requested by the application 102 from the storage elements 210a-210n that store the data.

The distributed storage system 100 in FIG. 1 includes redundant and independently operated storage elements 210 such that, if one particular storage element fails, the function of the failed storage element can easily be taken on by another storage element. In addition, the types, capacity, manufacturers, hardware technology, storage interfaces, etc. of the storage elements can be different based on the storage elements being redundant and independently operated, which benefits the scalability and flexibility of the distributed storage system 100. For example, a storage element can be easily added or removed without correlating to other storage elements already in use in the distributed storage system 100.

In the system 100, a protection level applies to the data that was already stored on the storage elements of the system 100. The protection level includes a set of failures that can be tolerated ("tolerable failures"), such that a data object can still be recovered even after such a failure occurs. For example, a protection level can provide that a data object stored on storage elements of storage nodes 106, 108, and 110 can be recovered from two concurrent data storage device failures.

Software communication mechanism 222 may be an object bus, direct socket communication among software modules, remote procedure calls, UDP broadcasts and receipts, HTTP connections, function, or procedure calls, etc. The software communication mechanism 222 can be implemented on any underlying hardware, for example, a network, the Internet, a bus, a combination thereof, etc.

In the illustrated embodiment of FIG. 2, the controller node 104 comprises an encoding module 212, a rule engine 214, a spreading module 216, a user interface engine 218, and a power reduction module 220. Depending on the implementation, the controller node 104, encoding module 212, rule engine 214, spreading module 216, user interface engine 218, and/or power reduction module 220 may comprise software and/or hardware. For example, one or more hardware logic modules, such as application-specific integrated circuits (ASICs), field-programmable gate arrays (FPGAs), or other suitable hardware logic, may be employed in place of, or as a supplement to, the software and/or firmware in the memory 720 to perform one or more of the functions or acts of the controller node 104 comprises an encoding module 212, a rule engine 214, a spreading module 216, a user interface engine 218, and a power reduction module 220. Other configurations are also possible and contemplated.

In some embodiments, the encoding module 212, which may be stored in the memory 204 and configured to be executed by the processor 202 in some embodiments, disassembles a data object received from the application 102 into a predetermined number of redundant sub-blocks or pieces to be stored across storage elements of the distributed storage system. A distributed storage system not only stores a data object on a plurality of storage elements, but also guarantees that the data object can be correctly retrieved when a certain number of the plurality of storage elements are unavailable (e.g., inaccessible, damaged). The encoding module 212 uses erasure-encoding techniques to disassemble a data object to achieve acceptable reliability with considerably less overhead than a standard replication scheme.

In some embodiments, the encoding module 212 disassembles the data object into data pieces based on a spreading policy included in a storage request. The spreading policy may be defined as a spreading width (W) over a maximum concurrent failure tolerance (F). The spreading width indicates the number of data storage devices that store the pieces of the data object, where each data storage device stores a piece of the data object. The maximum concurrent failure tolerance (F) indicates a number of data storage devices that store the pieces of the data object that are allowed to fail concurrently. The spreading width and the maximum concurrent failure tolerance satisfy the relationship W=K+F, where K is a minimum spreading requirement (i.e., the minimum number of data storage devices that store pieces of the data object and are not allowed to fail to successfully recreate the data object).

The encoding module 212 using a W/F encoding scheme greatly reduces the overhead as compared to standard replication schemes. In some embodiments, the encoding module 212 communicates with the user interface engine 218 to receive a spreading policy from a user. The user specifies a spreading policy for an individual object or a group of objects. For example, a user may specify a spreading policy for a group of objects for simplicity. In some embodiments, a decoding module (not shown) assembles the data pieces of a data object based on a unique object identifier associated with each piece of the data object to recover the data object.

The rules engine 214, which may be stored in the memory 204 and configured to be executed by the processor 202 in some embodiments, generates a hierarchy rule corresponding to a spreading policy. The hierarchy rule identifies a maximum number of data storage devices on each hierarchy level of a hierarchic tree structure of the distributed storage system 100 for spreading the data of the data object.

The user interface engine 218, which may be stored in the memory 204 and configured to be executed by the processor 202 in some embodiments, generates graphical data for displaying a user interface. In some embodiments the user interface engine 218 communicates with the rules engine 214 and the spreading module 216 to generate graphical data for displaying predefined spreading policies and protection levels including a set of tolerable failure scenarios to a user. In other embodiments, the user interface engine 218 generates a user interface for receiving a selection of a spreading policy and a protection level from a user. In some other embodiments, the user interface engine 218 receives instructions from the rules engine 214 to generate a user interface to notify the user to modify a spreading policy, a protection policy, and/or a set of tolerable failure scenarios. The user interface engine 218 may also communicate with the spreading module 216 to generate a user interface to notify the user of incompatibility between a hierarchy rule and an actual hierarchical deployment configuration of a distributed storage system, and instruct the user to modify a spreading policy and/or a protection level such that a hierarchy rule that is generated based on the modified spreading policy and/or the protection level is compatible with the hierarchical deployment configuration.

Figure 3:
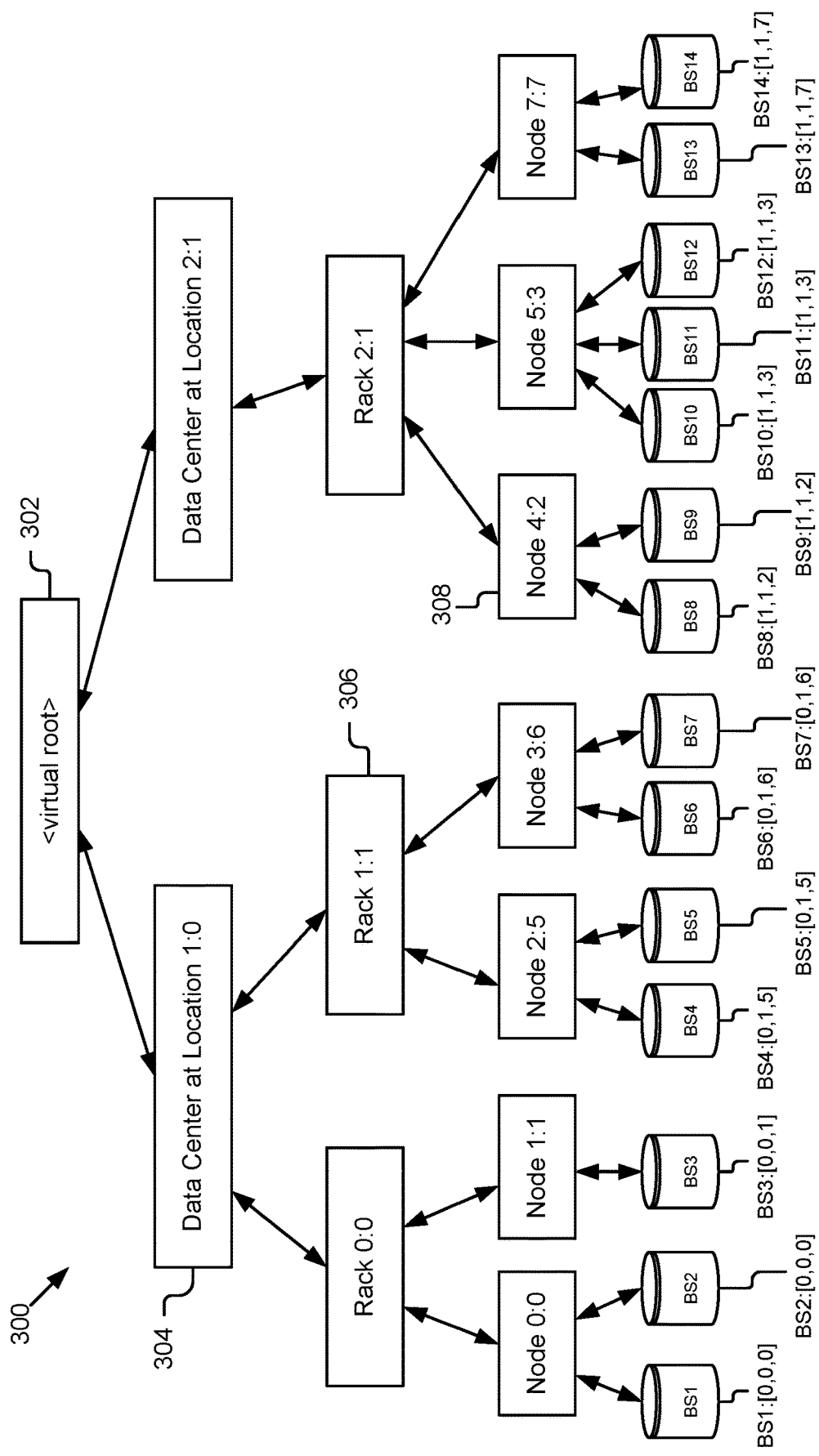
FIG. 3 is a block diagram illustrating an example hierarchic tree structure of the distributed storage system.

Referring now to FIG. 3, an example hierarchic tree structure 300 of a distributed storage system is shown. In the example of FIG. 3, the four levels of a hierarchical configuration of the distributed storage system form a tree structure. The virtual root in 302 is not part of the four levels as it represents an interface to access the data that is stored or retrieved to/from the distributed storage system. At the bottom level of the hierarchy 300 (i.e., the node level), the storage elements (e.g., data storage devices or block stores (BS)) are grouped according to their respective storage nodes. In the example of FIG. 3, fourteen data storage devices are grouped into seven storage nodes at the node level. At the middle level of the hierarchy 300 (i.e., the rack level), the storage nodes are grouped according to their respective racks. In the example of FIG. 3, seven storage nodes are grouped into three racks at the rack level. At the top level of the hierarchy 300 (i.e., the data center level), the racks are grouped according to their respective data centers. In the example of FIG. 3, three racks are grouped into two data centers at the data center level.

Each entity in the hierarchy 300 has a unique name and a unique identifier. An entity can be a data center, a rack, a storage node, a data storage device, etc. For example, a data center 304 at the top level has a name "Data Center at Location 1" and an identifier "0," a rack 306 at the middle level has a name "Rack 1" and an identifier "1," and a storage node 308 at the bottom level has a name "Node 4" and an identifier "2." A data storage device has a hierarchy identifier comprising an array of integers. Each integer of a hierarchy identifier corresponds to an identifier of a data center, a rack, and a node at a respective level of the hierarchy 300. These entities form a branch of the tree that ends up at the data storage device. For example, in FIG. 3, the rightmost data storage device at the bottom level has a name "BS14" and a hierarchy identifier "[1,1,7]." The numbers "1," "1," and "7" from left to right respectively correspond to identifiers of the "Data Center at Location 2," "Rack 2" and "Node 7" from top to bottom of a branch that ends at the data storage device BS14. In FIG. 3, the name and the identifier of an entity is separated by a colon.

A name of an entity is unique so that no two entities have the same name. An identifier of a data center at the top level is unique so that no data centers have the same identifier. For example, data centers in FIG. 3 are given unique identifiers 0 and 1. An identifier of a rack or a node is unique within the next higher level. In other words, racks are given unique identifiers within a data center. For example, in data center 0, the racks (i.e., Rack 0 and Rack 1) can have identifiers 0 and 1. In data center 1, the rack (i.e., Rack 2) can also have identifier 1. Each rack has a unique number within a specific data center. Similarly, down to the node level, the nodes are given unique identifiers within a rack (i.e., every node has a unique number within a specific rack). The unique names and identifiers associated with entities provide layout information of a distributed storage system, which is useful for distributing a data object in the system.

One way to distribute data across multiple entities of the hierarchic tree structure of a distributed storage system is based on a hierarchy rule. The hierarchy rule is a list of integer numbers where each number corresponds to the maximum number of storage devices that can be selected to store data for each element of that hierarchy level. In some embodiments, a hierarchy rule is in the form of [n1, n2, n3, n4], where the numbers n1, n2, n3, and n4 respectively indicate a maximum number of data storage devices on each hierarchy level of the hierarchic tree structure (e.g., the data center level, the rack level, the node level, and the device level), for spreading data of a data object to. For example, if the hierarchy rule is [6, 100, 2, 1], it means that a maximum number of W pieces (e.g., "chunks") of the encoded file may be stored at each level. In the hierarchy rule example, a maximum of 6 chunks may be stored in each data center, a maximum of 100 chunks may be stored in a rack, a maximum of 2 chunks may be stored in each node (e.g., just a bunch of disks (JBOD)), and a maximum of 1 chunk may be stored in each device (e.g., hard-disk driver (HDD) or solid-state drive (SSD)). The rule engine 214 generates the hierarchy rule based on a spreading policy and a set of tolerable failures specified by a user.

The spreading policy W/F determines that W pieces of the data object need to be stored on W data storage devices with a tolerance for F concurrent data storage device failures. The protection level includes a set of tolerable failure scenarios specified by the user. The rule engine 214 translates the spreading policy into the number associated with each hierarchy level in the hierarchy rule based on the protection level according to certain logic. The four main points of the logic are described below with an example spreading policy W/F=18/5 and an example hierarchy rule [100, 100, 4, 1].

First, if the maximum number associated with a hierarchy level in the hierarchy rule is greater than W of the spreading policy, the rule engine 214 determines that there is no restriction applied. Since the first 100 associated with the data center level and the second 100 associated with the rack level in the hierarchy rule [100, 100, 4, 1] are greater than W=18 of the spreading policy, the rule engine 214 determines that no restriction is applied to the data center level and the rack level. In other words, there is no need to select multiple data centers or multiple racks to store the data. The 18 data pieces of a data object can be put on a single data center and a single rack because each data center and each rack can store at most 100 data pieces.

Second, if the maximum number associated with a hierarchy level in the hierarchy rule is less than W of the spreading policy, the rule engine 214 determines that not all data can be spread on a single entity of this hierarchy level. The number 4 associated with the node level in the hierarchy rule [100, 100, 4, 1] is less than W=18 of the spreading policy, which means that 18 pieces of the data object cannot be stored on a single node. In fact, the number 4 at the node level indicates that a maximum 4 data storage device per node can be used to store the data, and therefore the rule engine 214 determines that the data object should be distributed to 18 nodes, with each node storing zero, one, or more than one pieces of data. The number 1 associated with the device level in the hierarchy rule [100, 100, 4, 1] is less than W=18 of the spreading policy, which means that 18 pieces of the data object cannot be stored on a single device. In fact, the number 1 at the node level indicates that a maximum 1 data storage device per node can be used to store the data, and therefore the rule engine 214 determines that the data object should be distributed to 18 devices, with each device storing one piece of data.

Third, if the maximum number associated with a hierarchy level in the hierarchy rule is greater than F of the spreading policy, the rule engine 214 determines that a failure of a single entity at this hierarchy level cannot be tolerated. Since the number 100 associated with the data center level and the rack level in the hierarchy rule [100, 100, 4, 1] is greater than F=5 of the spreading policy, a single data center failure and a single rack failure would violate the spreading policy. If a distributed storage system includes only a data center and/or a rack, in such a case, the original data object cannot be recovered.

Fourth, if the maximum number associated with a hierarchy level in the hierarchy rule is less than F of the spreading policy, the rule engine 214 determines that, in addition to a failure of a single entity at this hierarchy level, at least one further concurrent data storage device failure can be tolerated. The number 4 in the hierarchy rule [100, 100, 4, 1] is less than F=5 of the spreading policy, which means that a single node failure at the node level and at least an additional concurrent data storage device failure can be tolerated. F=5 of the spreading policy indicates that up to five pieces of data can be lost without affecting the recovery of the data object using the remaining 13 pieces of data. The number 1 in the hierarchy rule [100, 100, 4, 1] indicates that each device stores only one piece of data (e.g., on a single data storage device of the node). Therefore, in this case, in addition to a single device failure, up to four other devices can fail until a total of five data pieces are lost. Assuming that the hierarchy rule is changed to [100, 100, 2, 1]. The number 2 indicates that at most two data pieces can be stored on a single node (e.g., one piece each on two data storage devices of the node). In this case, in addition to a single node failure (i.e., two data storage device failures) up to three other data storage devices or one other node can fail until a total of five data pieces are lost. Two node failures lead to the loss of four data pieces, which is still tolerable. However, three node failures will cause six data pieces to be lost, which exceeds the maximum number of concurrent failures F=5 and results in the incapability of reconstructing and retrieving the data object.

In some embodiments, the rule engine 214 receives a set of tolerable failure scenarios specified by a user. The rule engine 214 generates the hierarchy rule based on a spreading policy and the set of tolerable failures specified by the user. For example, if the spreading policy is W/F=18/5, the rule engine 214 may determine multiple hierarchy rules using the logic described above. Responsive to receiving a set of tolerable failure scenarios, the rule engine 214 refines the hierarchy rules. If a user specifies that up to two racks can fail, the rule engine 214 determines the hierarchy rule to be [100, 2, 100, 1], for example.

Since the rack level element of the hierarchy rules (i.e., the second number 100) [100, 100, 1, 1] and [100, 100, 3, 1] is greater than W=18, the rule engine 214 determines that there is no restriction. The 18 data pieces of the data object can be stored on a single rack. However, there is no guarantee that two rack failures can be tolerated, as requested by the user in the failure scenario, since the entire data object (18 pieces) may be stored on a single rack. As a result, the rule engine 214 determines that the hierarchy rules [100, 100, 1, 1] and [100, 100, 3, 1] do not fulfill the user's requirement. On the other hand, since the product of the rack level element of the hierarchy rule [100, 2, 100, 1] (i.e., 2) and the number of rack failures specified by the user (i.e., 2) is less than F=5 (i.e., 4), the rule engine 214 determines that the hierarchy rule [100, 2, 100, 1] is sufficient when the user requires that up to two rack failures be tolerated.

It is advantageous that determining a spreading policy, a failure tolerance, and/or a hierarchy rule does not require information about the layout or deployment of a distributed storage system. For example, a user may specify what kind of failures from which a data object can survive without knowledge of the hierarchical tree structure of the storage system and save the time associated with retrieving the extensive deployment information. In practice, the user may be provided a set of predefined policies that cover most common use cases and a description about what kind of failures that a data object may survive, which further simplifies the user's task for specifying failures and minimizes the user's need for knowledge about how the storage system works.

The spreading module 216, which may be stored in the memory 204 and configured to be executed by the processor 202 in some embodiments, selects data storage devices in the distributed storage system 100 to store a data object using a hierarchy rule and a spreading policy. In some embodiments, responsive to receiving a request for spreading a data object in a distributed storage system 100, the rule engine 214 determines a hierarchy rule [n1, n2, n3, n4] based on a spreading policy W/F and a protection level included in the request, and transfers the hierarchy rule to the spreading module 216. The spreading module 216 identifies a hierarchical deployment configuration of the system 100, and determines whether the hierarchy rule is compatible with the hierarchical deployment configuration. Responsive to the hierarchy rule being compatible with the hierarchical deployment configuration, the spreading module 216 identifies which data storage devices in the system 100 should be used for storing the data and transfers the data to the identified data storage devices for storing.

As described above, given a number of data pieces for a data object W and a number of data pieces that can be lost F, and given a set of tolerable failure scenarios that the data object is able to survive, the rule engine 214 generates the maximum number of data centers, racks, and nodes used to store a data object (i.e., the hierarchy rule). The generation of the hierarchy rule does not relate to the hierarchical deployment configuration of a distributed storage system. Therefore, it is possible that the hierarchy rule may not be compatible with the hierarchical deployment configuration.

The spreading module 216 determines whether the hierarchy rule is compatible with the hierarchical deployment configuration by determining whether each entity of a hierarchy level meets the maximum number of data storage devices associated with the hierarchy level without receiving information about the data storage devices used at other entities of the hierarchy level. For example, a user selects a spreading policy W/F=18/5 that defines a data object be distributed into 18 pieces such that failure of up to 5 pieces can be tolerated and a protection level that defines that the failure of a single data center can be tolerated. As a result, the rule engine 214 determines that no more than 5 pieces of data can be put on any single data center, and creates a maximum number of 5 on the data center level of a hierarchy rule.

The spreading module 216 receives this hierarchy rule and identifies that the actual hierarchical deployment configuration of the distributed storage system includes only two data centers to fulfill this rule. Because of the maximum number of 5 on the data center level of the hierarchy rule, at most 10 data pieces can be stored between the two data centers, which is less than 18 data pieces selected in the spreading policy. As a result, the spreading module 216 determines that the hierarchy rule is incompatible with the hierarchical deployment of the system because the entire data object cannot be stored according to the user-selected protection level. When the spreading module 216 determines that the hierarchy rule corresponding to a spreading policy cannot be fulfilled by the hierarchical layout or deployment of the distributed storage system, the spreading module 216 communicates with the user interface engine 218 to notify the user of the incompatibility and instruct the user to modify at least one of the spreading policy and the protection level such that the hierarchy rule is compatible with the hierarchical deployment configuration.

If the spreading module 216 determines that the hierarchy rule is compatible with the hierarchical deployment configuration of the distributed storage system, the spreading module 216 selects the data storage devices for storing the pieces of the data object using the hierarchy rule and the spreading policy and distributes the pieces to the selected data storage devices. Referring back to FIG. 3, the spreading module 216 identifies that the hierarchical deployment of the system as shown in FIG. 3 includes two data centers, three racks, and seven nodes that comprise 14 data storage devices. Suppose that a user requests to spread a first data object using a spreading policy W/F=6/3.

The user also specifies a protection level that the first data object survive a single node failure. Based on the spreading policy and the protection level, the rule engine 214 determines that the hierarchy rule is [100, 100, 2, 1]. The number 2 associated with the node level in [100, 100, 2] indicates that each node can use up to two data storage devices to store two pieces of data. The spreading module 216 determines that multiple ways to store the pieces of the first data object are possible. For example, the spreading module 216 may determine, to use both data centers at the data center level, the three racks at the rack level, and any six of the seven nodes at the node level to store the six pieces of data with each node storing one piece of data. Alternatively, the spreading module 216 may determine to use the two data centers at the data center level, two racks out of the three racks (e.g., Rack 0 and Rack 2) at the rack level, and any six data storage devices of four nodes at the node level to store the six pieces of data (e.g., BS1 and BS2 of Node 0, BS3 of Node 1, BS8 and BS9 of Node 4, and BS14 of Node 7).

This example illustrates one advantage of the distributing algorithm described herein, that is, a user can require the data to be stored under a certain protection level (e.g., failure scenarios) regardless of the actual layout of the storage system and where the data is stored. The spreading module 216 cooperates with other modules/engines to fulfill the user's requirement by actually distributing the data in the system and providing the required protection to the data. Another advantage of the distributing algorithm described herein is that expansion of the system 100 will not invalidate the protection level applied to the data already stored in the system 100. The spreading module 216 may be configured as a means for distributing erasure-encoded data of a first data object across first and second portions of a distributed storage system using a hierarchy rule corresponding to a spreading policy based on a set of tolerable failures from which the first data object can be recovered. In the various embodiments, the tolerable failures may be induced by intentionally disabling or power-off one or more portions of the distributed storage system as further described below.

Figure 4:
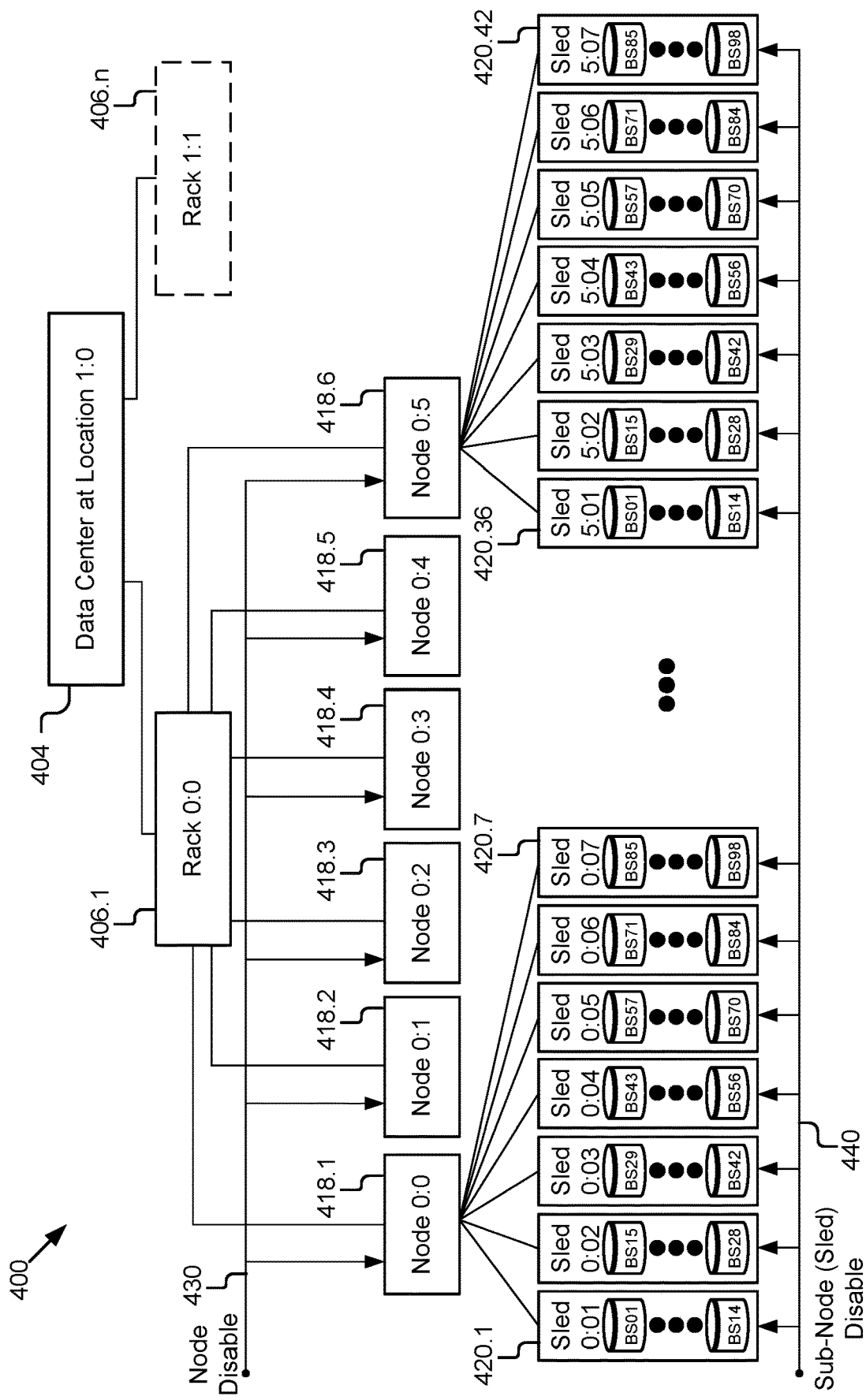
FIG. 4 is a block diagram illustrating an example hierarchic tree structure of the distributed storage system based on a hierarchic tree structure.

FIG. 4 illustrates an example hierarchic tree structure 400 of a distributed storage system is shown. The example of FIG. 4 includes an architecture of storage elements similar to structured storage systems having a specific quantity of nodes per rack and a specific quantity of storage devices per node. One such example may include an ActiveScale™ X100 by Western Digital Technologies, Inc., which may be configured as a single rack including six nodes, with each node including ninety-eight storage devices. Further, each group of fourteen storage devices may be configured in a group known as a 'sled.'

In the example of FIG. 4, the four levels of a hierarchical configuration of the distributed storage system form a tree structure, as described above. Further, an alternative embodiment described herein further includes a grouping or "sled" of, for example, fourteen devices, BS1-BS14, BS15-BS28, BS29-BS42, BS43-BS56, BS57-BS70, BS71-BS84, and BS85-BS98. As stated above, at the bottom level of the hierarchy 400 the storage elements (e.g., data storage devices or block stores) are grouped according to their respective storage nodes. In the example of FIG. 4, fourteen data storage devices are grouped into seven sub-nodes 420.1-420.42. At the next upper-middle level includes six nodes 418.1-418.6, with each connected to seven sub-nodes 420 (e.g., sleds). At the middle level of the hierarchy 400 (i.e., the rack level), the storage nodes 418 are grouped according to their respective racks 406. In the example of FIG. 4, six storage nodes are grouped into one rack 406.1 at the rack level. At the top level of the hierarchy 400 (e.g., the data center level), the racks 406 are not grouped according to their respective data centers 404.

Each entity in the hierarchy 400 has a unique name and a unique identifier. An entity can be a data center, a rack, a storage node, sub-node, and a data storage device, etc. In the illustrated example of FIG. 4, the distributed storage system 400 includes a single rack 406.1, which includes six nodes (e.g., JBODs) 418. Each of the nodes 418 includes ninety-eight devices (BS) spread over seven sub-nodes (e.g., sleds) 420, with each sub-node including fourteen devices BS.

In the distributed storage system 400, the total power consumption is the sum of the power consumption of all the individual units at the various levels (e.g., racks, nodes, sub-nodes, devices, storage servers, storage devices, networking switches, etc.).

For a distributed storage system, data durability and data availability are extremely important. This typically puts some limitations on erasure-encoded data chunks. For example, to ensure high enough data durability, all data objects of a spread width of W chunks need to be successfully written to storage devices during data ingest, following the hierarchy rule described above. The hierarchy rule puts an under-limit on the number of storage components of a distributed storage system that should to be reachable or online consistently (e.g., all the time, have as minimal downtime as possible, etc.). If too many components are offline or unreachable, then the data object cannot be recreated from the erasure-encoded chunks or new data objects cannot be written in erasure-encoded chunks.

To ensure permanent data availability, at least W-F chunks of each stored object data should be available consistently. This puts an under-limit on the number of storage components of a distributed storage system that should to be reachable or online consistently.

As described herein, a spreading policy (spreading width (W) and maximum concurrent fault tolerance (F)) of W/F or 18/5, and a hierarchy rule are selected in such a way that a first part (e.g., one or more of the racks, nodes, sub-nodes, or devices) of the distributed storage system 400 may be disabled or powered-off, while not affecting the durability and availability of the stored data. Powering-off a portion of the distributed storage system 400 using the node disable signal 430 or the sub-node disable signal 440 can result in a reduction of the total power consumption of the storage system.

As an example of the power reduction of a commercially available system, such as an ActiveScale™ X100 system available from Western Digital Technologies, Inc., may be configured using an 18/5 spreading policy and [100, 100, 4, 1] hierarchy rule. As used herein, the '4' at storage node level in the hierarchy rule, means that each storage node (e.g., JBOD) 418 can have a maximum of 4 chunks of the encoded object data stored therein. Given that the maximum concurrent fault tolerance (F) is equal to 5, this means that we are still able to read or write all of the data when one storage node (e.g., JBOD) 418 is powered-off by the node disable signal 430. That is because when one storage node 418 is powered-off, there are still five other storage nodes 418 powered-on and available for reconstructing the encoded object data. Because of the '4' at storage node level in the hierarchy rule of [100, 100, 4, 1], the system also remains available to write encoded data at full durability when one of the storage nodes 418 is powered-down. By way of observed results, the power reductions in the exemplary ActiveScale™ X100 system have been observed to provide a 12%-13% reduction in power consumption when one of the storage nodes 418 is powered-off.

The node disable signal 430 and the sub-node disable signal 440 may be controlled by the power reduction module 220 of FIG. 2. The power reduction module 220, which may include instructions stored in memory 204 and executed by processor 202 in some embodiments, may cause control signals to be generated over bus or software communication mechanism 222. The power reduction module 220 may disable the first portion of the distributed storage system that includes a first portion of the erasure-encoded data of the first data object, wherein the first portion of the distributed storage system is determined according to the spreading policy and the hierarchy rule identifying the set of tolerable failures, the second portion of the distributed storage system including portions of the erasure-encoded data configured to recreate the first data object.

While disabling or powering-off a specific portion of the distributed storage system 400 has been described, alternative aspects are further contemplated that include utilizing the spreading policy and hierarchy rule to power-off different or alternating portions of the distributed storage system 400. For example, one storage node 418, such as storage node 418.1, may be powered-off during a first time period, with the other storage nodes 418.2-418.6 remaining powered-on. Then during a second time period, the storage node 418.1 may be powered-on with a different one of the storage nodes 418.2-418.6 being powered-off. This sequencing of powering-off a different one of the storage nodes 418 may occur according to an advantageous time period based on various factors including traffic load on the distributed storage system 400, age or calculated reliability of specific ones of the storage nodes 418, and other factors that contribute to the overall reliability of the distributed storage system 400.

In the various aspects, choosing a spreading policy and a hierarchy rule to allow a first portion of the distributed storage system to be disabled or powered-off is closely related to the erasure-encoding overhead. Specifically, in order to power-off a portion of the distributed storage system while maintaining data durability and availability may include a modification to the spreading policy, which in turn, may further increase the encoding overhead resulting in an increase in power consumption. Accordingly, a practical selection of a spreading policy and hierarchy rule that results in an overall power reduction that is greater than the increase in power consumption by the increased overhead is useful.

Using the above-identified ActiveScale™ X100 system as an example with an exemplary spreading policy of 18/5 and an exemplary hierarchy rule of [100, 100, 4, 1], the distributed storage system 400 may disable (e.g., power-down) one of the storage nodes 418 without modifying storage overhead. In such a configuration, the net power reduction in the distributed storage system 400 results in an approximate power savings, for example, of about 10% or more.

In another example, an exemplary spreading policy and an exemplary hierarchy rule may be determined to accommodate the concurrent disabling (e.g., powering-off) of two storage nodes 418 in the distributed storage system 400. Such an arrangement in the above-identified ActiveScale™ X100 system may result in a reduction in power consumption of approximately 24%-26% when compared to a 'fully powered on' exemplary configuration. To maintain the data availability and durability, a system would need to use a 16/8 spreading policy and a hierarchy rule of [100, 100, 4, 1]. This allows writing 4 chunks to each of the remaining storage nodes 418 when two of the storage nodes 418 are powered off. Such a configuration also ensures that a maximum of eight chunks are unavailable when two storage nodes 418 are powered off, as required to ensure data availability. The storage overhead of such an erasure-encoding policy is 2.00. This means that we are increasing the storage overhead by ~45% (1.38 to 2.00), to accomplish a power reduction of 24-26%. Such a configuration, in fact, increases power consumption and would not be an acceptable solution.

Accordingly, improved net power reduction can typically be achieved by constructing a spreading policy and hierarchy rule that allows multiple orthogonal/independent parts of a distributed storage system to be concurrently powered off. By way of example and using the arrangement in the above-identified ActiveScale™ X100 system as illustrated in FIG. 4, power consumption may be reduced by 12%-13% without changing the storage overhead by disabling (powering-off) one storage node 418 at a time, as described above.

Further power reduction may be reduced by disabling one sub-node 420 (e.g., one sled) at a time in the remaining powered storage nodes 418. Such a configuration utilizes a different spreading policy, for example, a spreading policy of 14/4, which has a storage overhead of 1.4. Such a configuration also requires a different hierarchy rule, and may even use different hierarchy levels. In the previous examples, there were four hierarchy levels: data center, rack, storage nodes, and storage devices. With the inclusion of sub-nodes 420 (e.g., sleds), the encoded data may be evenly spread across the sub-nodes. Therefore, the hierarchy then includes five levels: data center, rack, storage nodes, sub-nodes, and devices. In such a configuration, a hierarchy rule may become [100, 100, 3, 1, 1]. Such a configuration increases the storage overhead by 1.4%, but results in a 23% reduction of power consumption when compared to the 'always on' case. Accordingly, the latter example of a power consumption reduction of 23% using a spreading policy of 14/4, and a five-level hierarchy rule, results in an additional 12% of power reduction. The reduction of power consumption is clearly higher than the increase in storage overhead resulting in an appreciable net gain to the system.

Figure 5:
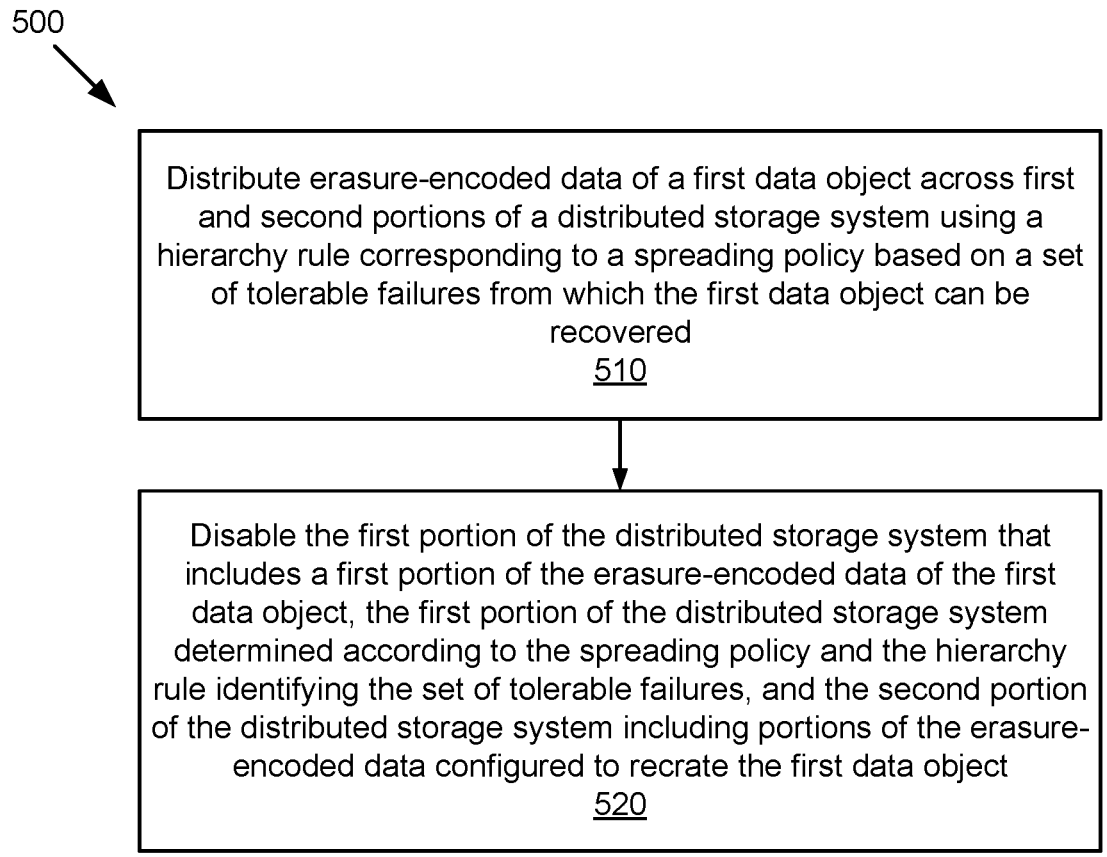
FIG. 5 is a flowchart of an example method for reducing power consumption in a distributed storage system implementing a hierarchical rule and spreading policy, according to the techniques described herein.

FIG. 5 is a flowchart of an example method 500 for reducing power consumption in a distributed data storage system using a hierarchy rule that is generated based on a spreading policy and a set of tolerable failures which may be induced for the purposes of reducing power consumption. At a block 510, the system and method distribute erasure-encoded data of a first data object in a distributed storage system using a hierarchy rule corresponding to a spreading policy based on a set of tolerable failures from which the first data object can be recovered. In one aspect, the hierarchy rule is based on a hierarchy of one or more of data centers, racks, nodes, and devices in the distributed storage system. In another aspect, the hierarchy further includes one or more sub-nodes located between the nodes and the devices in the hierarchy, and the first portion includes at least one of the sub-nodes.

At a block 520, the system and method disable a first portion of the distributed storage system that includes a first portion of the erasure-encoded data, wherein the first portion is determined according to the spreading policy and the hierarchy rule identifying the set of tolerable failures. In one aspect, disabling a first portion of the distributed storage system includes suspending power to the first portion of the distributed storage system. In another aspect, the first portion includes at least one of the nodes. Further, the distributed storage system includes at least a first node and a second node, and the disabling the first portion alternates between the first node and the second node. In another aspect, the distributed storage system includes at least a first sub-node and a second sub-node, and the disabling the first portion alternates between the first sub-node and the second sub-node.

Various aspects for reducing power consumption in a distributed storage system using a hierarchy rule that is generated based on a spreading policy and a set of tolerable failures are disclosed. A system and/or method may operate to distribute erasure-encoded data of a first data object in a distributed storage system using a hierarchy rule corresponding to a spreading policy based on a set of tolerable failures induced by powering-down one or more portions of the distributed storage system. The remaining portions of the distributed storage system may be used to recover the first data object. A first portion of the distributed storage system may include a first portion of the erasure-encoded data. The first portion may be determined according to the spreading policy and the hierarchy rule identifying the set of tolerable failures. The first data may be read from or written to a second portion of the distributed storage system that remains enabled, wherein the second portion including portions of the erasure-encoded data configured to recreate the first data.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above primarily in the context of online services; however, the disclosed technologies apply to other data sources and other data types (e.g., collections of other resources for example images, audio, web pages). It should be understood that the various examples provided herein are non-limiting and that variations and alternative configurations are contemplated.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, for example, but is not limited to, any type of data storage device including floppy disks, optical disks, compact disc read-only memories (CD-ROMs), and magnetic disks, read-only memories (ROMs), random-access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

The disclosed technologies can take the form of a hardware implementation, a software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies, and other aspects are not mandatory or significant, and the mechanisms that implement the present techniques and technologies or its features may have different names, divisions and/or formats.

Furthermore, the modules, routines, features, attributes, methodologies, and other aspects of the present technology can be implemented as software, hardware, firmware, or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method comprising:
   determining a hierarchy rule and a spreading policy for a distributed storage system, wherein:
      the distributed storage system includes nodes comprised of a plurality of data storage devices;
      the spreading policy is based on a number of tolerable failures of data storage devices from which a data object is recoverable; and
      the spreading policy is configured to distribute erasure-encoded data to each node in a number that is less than the number of tolerable failures of data storage devices;
   determining a first time period for intentionally inducing a power savings by disabling at least one node, each node of the at least one node comprised of operable data storage devices of the plurality of data storage devices;
   distributing erasure-encoded data of a first data object across a first portion and a second portion of the distributed storage system using the hierarchy rule and the spreading policy;
   disabling, based on a disable signal for the at least one node and for the first time period, the first portion of the distributed storage system that includes a first portion of the erasure-encoded data of the first data object, wherein, during the first time period:
      the first portion of the distributed storage system includes the at least one node of operable data storage devices;
      the second portion of the distributed storage system includes portions of the erasure-encoded data configured to recreate the first data object; and
      the disabling the first portion of the distributed storage system includes suspending power to a plurality of data storage devices in the first portion of the distributed storage system; and
   powering on the plurality of data storage devices in the first portion of the distributed storage system for a second time period following the first time period.

2. The computer-implemented method of claim 1, further comprising:
   recreating the first data object using the plurality of data storage devices in the first portion of the distributed storage system during the second time period.

3. The computer-implemented method of claim 1, wherein the hierarchy rule is based on a hierarchy of one or more of data centers, racks, nodes, and devices in the distributed storage system.

4. The computer-implemented method of claim 1, wherein:
   the nodes in the distributed storage system include at least a first node and a second node;
   during the first time period, the first portion of the distributed storage system includes the first node and the second portion of the distributed storage system includes the second node;
   during the second time period, the first portion of the distributed storage system includes the second node and the second portion of the distributed storage system includes the first node; and
   disabling the first portion of the distributed storage system includes alternately suspending power to the first node during the first time period and the second node during the second time period.

5. The computer-implemented method of claim 1, wherein the spreading policy and the hierarchy rule are selected to allow the first portion of the distributed storage system to be disabled without affecting the distributed storage system from reading or writing the first data object.

6. The computer-implemented method of claim 3, wherein the hierarchy further includes one or more sub-nodes located between the nodes and the devices in the hierarchy.

7. The computer-implemented method of claim 6, wherein the first portion of the distributed storage system includes at least one of the one or more sub-nodes.

8. The computer-implemented method of claim 6, wherein:
   the one or more sub-nodes includes at least a first sub-node and a second sub-node; and
   the disabling the first portion of the distributed storage system alternates between the first sub-node and the second sub-node.

9. A distributed storage system comprising:
   a set of non-volatile data storage devices;
   a plurality of nodes, wherein each node is comprised of a plurality of data storage devices from the set of non-volatile data storage devices; and
   a controller node configured to:
      determine a hierarchy rule and spreading policy for the distributed storage system, wherein:
         the spreading policy is based on a number of tolerable failures of data storage devices from which a data object is recoverable; and
         the spreading policy is configured to distribute erasure-encoded data to each node in a number that is less than the number of tolerable failures of data storage devices;
      determine a first time period for intentionally inducing a power savings by disabling at least one node, each node of the at least one node comprised of operable data storage devices of the plurality of data storage devices;
      distribute erasure-encoded data of a first data object across a first portion and a second portion of the distributed storage system using the hierarchy rule and the spreading policy;

disable, based on a disable signal for the at least one node and for the first time period, the first portion of the distributed storage system that includes a first portion of the erasure-encoded data of the first data object, wherein, during the first time period:
  the first portion of the distributed storage system includes the at least one node of operable data storage devices;
  the second portion of the distributed storage system includes portions of the erasure-encoded data configured to recreate the first data object; and
  disabling the first portion of the distributed storage system includes suspending power to a plurality of data storage devices in the first portion of the distributed storage system; and
power on the plurality of data storage devices in the first portion of the distributed storage system for a second time period following the first time period.

10. The distributed storage system of claim 9, wherein:
the controller node is further configured to:
  recreate the first data object using the plurality of data storage devices in the first portion of the distributed storage system during the second time period.

11. The distributed storage system of claim 9, wherein the hierarchy rule is based on a hierarchy of one or more of data centers, racks, nodes, and devices in the distributed storage system.

12. The distributed storage system of claim 11, wherein:
the plurality of nodes in the distributed storage system includes at least a first node and a second node;
during the first time period, the first portion of the distributed storage system includes the first node and the second portion of the distributed storage system includes the second node;
during the second time period, the first portion of the distributed storage system includes the second node and the second portion of the distributed storage system includes the first node; and
disabling the first portion of the distributed storage system includes alternately suspending power to the first node during the first time period and the second node during the second time period.

13. The distributed storage system of claim 11, wherein the hierarchy further includes one or more sub-nodes located between the nodes and the devices in the hierarchy.

14. The distributed storage system of claim 13, wherein the first portion of the distributed storage system includes at least one of the one or more sub-nodes.

15. The distributed storage system of claim 13, wherein:
the one or more sub-nodes includes at least a first sub-node and a second sub-node; and
to disable the first portion of the distributed storage system alternates between the first sub-node and the second sub-node.

16. A distributed storage system comprising:
a plurality of nodes, wherein each node is comprised of a plurality of data storage devices;
means for determining a hierarchy rule and spreading policy for the distributed storage system, wherein:
  the spreading policy is based on a number of tolerable failures of data storage devices from which a data object is recoverable; and
  the spreading policy is configured to distribute erasure-encoded data to each node in a number that is less than the number of tolerable failures of data storage devices;
means for determining a first time period for intentionally inducing a power savings by disabling at least one node, each node of the at least one node comprised of operable data storage devices of the plurality of data storage devices;
means for distributing erasure-encoded data of a first data object across a first portion and a second portion of the distributed storage system using the hierarchy rule and the spreading policy;
means for disabling, based on a disable signal for the at least one node and for the first time period, the first portion of the distributed storage system that includes a first portion of the erasure-encoded data of the first data object, wherein, during the first time period:
  the first portion of the distributed storage system includes the at least one node of operable data storage devices;
  the second portion of the distributed storage system includes portions of the erasure-encoded data configured to recreate the first data object; and
  the disabling the first portion of the distributed storage system includes suspending power to a plurality of data storage devices in the first portion of the distributed storage system; and
means for powering on the plurality of data storage devices in the first portion of the distributed storage system for a second time period following the first time period.

17. The distributed storage system of claim 16, further comprising:
means for recreating the first data object using the plurality of data storage devices in the first portion of the distributed storage system during the second time period.

18. The distributed storage system of claim 16, wherein the spreading policy and the hierarchy rule are selected to allow the first portion of the distributed storage system to be disabled without affecting the distributed storage system from reading or writing the first data object.

* * * * *